(12) United States Patent
Clymer et al.

(10) Patent No.: US 7,471,293 B2
(45) Date of Patent: Dec. 30, 2008

(54) METHOD, SYSTEM, AND COMPUTER PROGRAM PRODUCT FOR DISPLAYING CALENDAR-BASED SLO RESULTS AND BREACH VALUES

(75) Inventors: Shawn A. Clymer, Raleigh, NC (US); Michael D. Tabron, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 535 days.

(21) Appl. No.: 11/054,674

(22) Filed: Feb. 9, 2005

(65) Prior Publication Data

US 2006/0179412 A1  Aug. 10, 2006

(51) Int. Cl.
*G06T 11/20* (2006.01)
*G09G 5/00* (2006.01)

(52) U.S. Cl. ............... 345/440; 345/440.2; 345/629

(58) Field of Classification Search ............ 345/619, 345/440, 440.2, 629; 705/8; 718/104
See application file for complete search history.

(56) References Cited

U.S. PATENT DOCUMENTS

| | | | |
|---|---|---|---|
| 5,446,874 A | 8/1995 | Waclawsky et al. | |
| 5,553,235 A | 9/1996 | Chen et al. | |
| 5,864,483 A | 1/1999 | Brichta | |
| 5,956,691 A | 9/1999 | Powers | |
| 6,487,604 B1 | 11/2002 | Rochford et al. | |
| 6,694,288 B2 | 2/2004 | Smocha et al. | |
| 6,701,342 B1 | 3/2004 | Bartz et al. | |
| 6,738,933 B2 | 5/2004 | Fraenkel et al. | |
| 6,807,156 B1 | 10/2004 | Veres et al. | |
| 2002/0118192 A1 | 8/2002 | Couckuyt et al. | |
| 2003/0071814 A1* | 4/2003 | Jou et al. ................ | 345/400 |
| 2003/0093528 A1 | 5/2003 | Rolia | |
| 2004/0252121 A1* | 12/2004 | Bhatt et al. ............. | 345/400 |
| 2004/0252136 A1* | 12/2004 | Bhatt et al. ............. | 345/619 |
| 2005/0192930 A1* | 9/2005 | Hightower et al. ........ | 707/1 |
| 2005/0198042 A1* | 9/2005 | Davis ..................... | 707/10 |
| 2007/0000611 A1* | 1/2007 | Shannon et al. ...... | 156/345.28 |
| 2007/0174083 A1* | 7/2007 | Silverman et al. ......... | 705/1 |

* cited by examiner

*Primary Examiner*—Chante Harrison
(74) *Attorney, Agent, or Firm*—David Irvin; Hoffman Warnick LLC (57) ABSTRACT

The present invention provides a method, system, and computer program product for displaying calendar-based service level objective (SLO) results and breach values. The method comprises: generating a plurality of area charts, wherein each area chart displays SLO result data for a different calendar period and for a different state of the service, and wherein each area chart displays a start and end of a respective calendar period; generating a first line chart displaying calendar periods corresponding to a predetermined state of the service, wherein the first line chart displays a start and end of each calendar period corresponding to the predetermined state; and overlaying and displaying the plurality of area charts and the first line chart to provide a first composite view of SLO information for the service, wherein the calendar periods in the plurality of area charts and the first line chart do not overlap.

16 Claims, 7 Drawing Sheets

METHOD, SYSTEM, AND COMPUTER PROGRAM PRODUCT FOR DISPLAYING CALENDAR-BASED SLO RESULTS AND BREACH VALUES

BACKGROUND OF THE INVENTION

1. Field of the Invention

The present invention generally relates to service level objectives (SLOs). More particularly, the present invention provides a method, system, and computer program product for displaying calendar-based SLO results and breach values.

2. Related Art

A Service Level Agreement (SLA) is a contract between a service provider and a customer defining the criteria for the specific services that the customer expects the service provider to deliver. A service level management system tracks the services provided to the customer against the SLA.

An SLA is made up of service level objectives (SLOs), each of which defines a set of resources of a particular resource type (e.g., database server), the metric that is being measured on the resource (e.g., availability), and one or more thresholds (e.g., 98% available during peak and 100% during critical periods). Over time, on a defined business schedule as contracted with the customer, measurement data is evaluated for the set of resources for each SLO and it is determined if any of the thresholds have been breached, causing a violation. For example, an enterprise information technology (IT) provider could have a monthly Operational Level Agreement (a.k.a, Internal SLA) with an internal customer whereby if a database server is unavailable for more than 5% of a month, then it will cause a violation. Since the results of service level evaluations are not discrete values, but rather values over a time period from start to finish, conveying all this information in a single view is not possible using charting tools that do not allow charts to be overlaid onto one another. As such, the view provided by such charting tools is restricted to a single set of homogeneous data. This is complicated further by the association of a business calendar to define peak, critical, and maintenance periods associated with the customer. Furthermore, most SLA products do not implement a calendar-based evaluation function and chart only the end time of the evaluation period on simple bar charts with the threshold value shown as a fixed line. Those SLA products that do implement calendar-based evaluations, however, narrow the view to only a single evaluation result for a particular calendar period. Unfortunately, existing SLA products neglect to convey at least the following information: 1) when a maintenance period starts and ends; 2) when a non-maintenance period starts and ends; 3) the SLO threshold level for a particular calendar period; and 4) times when a service level could not be calculated do to problems with the data source (e.g., monitor failed due to power outage).

SUMMARY OF THE INVENTION

In general, the present invention provides a method, system, and computer program product for displaying calendar-based service level objective (SLO) results and breach values. In particular, in accordance with the present invention, a set of n independent charts are created and overlaid on top of one another to construct a composite view of an SLO evaluation period. The n charts comprise: x area charts and y line charts. Each area chart displays an SLO result for a different, predetermined, non-overlapping calendar period (e.g., 9 am to 5 pm). A first line chart displays the calendar period(s) during which maintenance (e.g., a backup) was performed and/or during which there was no planned service, while each of the other line charts displays the SLO threshold value for a different state. The composite view shows at least the following: 1) when each calendar period starts and ends, 2) the result achieved during each calendar period, 3) when a maintenance period starts and ends, 4) when a non-maintenance period starts and ends; 5) the SLO threshold for each calendar period, and 6) an indicator for periods where the data source failed due to some unavoidable problem.

A first aspect of the present invention is directed to a method for displaying service level objective (SLO) information for a service, comprising: generating a plurality of area charts, wherein each area chart displays SLO result data for a different calendar period and for a different state of the service, and wherein each area chart displays a start and end of a respective calendar period; generating a first line chart displaying calendar periods corresponding to a predetermined state of the service, wherein the first line chart displays a start and end of each calendar period corresponding to the predetermined state; and overlaying and displaying the plurality of area charts and the first line chart to provide a first composite view of SLO information for the service, wherein the calendar periods in the plurality of area charts and the first line chart do not overlap.

A second aspect of the present invention is directed to a system for displaying service level objective (SLO) information for a service, comprising: a system for generating a plurality of area charts, wherein each area chart displays SLO result data for a different calendar period and for a different state of the service, and wherein each area chart displays a start and end of a respective calendar period; a system for generating a first line chart displaying calendar periods corresponding to a predetermined state of the service, wherein the first line chart displays a start and end of each calendar period corresponding to the predetermined state; and a system for overlaying and displaying the plurality of area charts and the first line chart to provide a first composite view of SLO information for the service, wherein the calendar periods in the plurality of area charts and the first line chart do not overlap.

A third aspect of the present invention is directed to a program product stored on a computer recordable medium for displaying service level objective (SLO) information for a service, the computer recordable medium comprising program code for performing the following steps: generating a plurality of area charts, wherein each area chart displays SLO result data for a different calendar period and for a different state of the service, and wherein each area chart displays a start and end of a respective calendar period; generating a first line chart displaying calendar periods corresponding to a predetermined state of the service, wherein the first line chart displays a start and end of each calendar period corresponding to the predetermined state; and overlaying and displaying the plurality of area charts and the first line chart to provide a first composite view of SLO information for the service, wherein the calendar periods in the plurality of area charts and the first line chart do not overlap.

A fourth aspect of the present invention is directed to a method for deploying an application for displaying service level objective (SLO) information for a service, comprising: providing a computer infrastructure being operable to: generate a plurality of area charts, wherein each area chart displays SLO result data for a different calendar period and for a different state of the service, and wherein each area chart displays a start and end of a respective calendar period; generate a first line chart displaying calendar periods corresponding to a predetermined state of the service, wherein the first line chart displays a start and end of each calendar period corresponding to the predetermined state; and overlay and display the plurality of area charts and the first line chart to provide a first composite view of SLO information for the service, wherein the calendar periods in the plurality of area charts and the first line chart do not overlap.

BRIEF DESCRIPTION OF THE DRAWINGS

These and other features of this invention will be more readily understood from the following detailed description of the various aspects of the invention taken in conjunction with the accompanying drawings in which.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system, and computer program product for displaying calendar-based service level objective (SLO) results and breach values.

A Service Level Agreement (SLA) for a customer comprises a business schedule and a set of service level objectives (SLOs). Each SLO defines a set of resources of a particular resource type (e.g., database server), the metric that is being measured on the resource (e.g., availability), and one or more thresholds (e.g., 98% available during peak and 100% during critical periods). The business schedule contains a series of calendar periods, each of which is associated with a particular state (e.g., Peak, Critical, Off Peak, Month-End Processing, Maintenance/No Service, etc.). An example of an SLA for the loan mortgage department of a large bank is as follows:

Customer: Loan Mortgage Department

Business Schedule:
Peak: 08:00 to 10:00, Monday through Friday
Critical: 10:00 to 15:00, Monday through Friday
Peak: 15:00 to 17:00, Monday through Friday
Off Peak: 17:00 to 20:00, Monday through Friday
Month-End Processing: 00:00 to 23:59 on the last Friday of each month
Maintenance/No Service: All other times Service Level Objectives:
SLO 1=Mainframe Access checks access every 15 minutes
Metric: Session Response Time Breach Values:
Critical: 2000 ms
Peak: 2200 ms
Off Peak: 5000 ms
Month-End Processing: 1000 ms Suppose that the following results were achieved for an SLO evaluation period comprising Thursday, Friday, and Saturday, wherein Friday comprises the last Friday of a month:

Thursday:

| State | Period Start | Period End | Session Response Time (ms) |
| --- | --- | --- | --- |
| Peak | 08:00 | 10:00 | 2500 |
| Peak | 15:00 | 17:00 | No Data (Power Failure) |
| Critical | 10:00 | 15:00 | 1200 |
| Off Peak | 17:00 | 20:00 | 3000 |

Friday:

| State | Period Start | Period End | Response Time (ms) |
| --- | --- | --- | --- |
| Month-End Processing | 00:00 | 23:59 | 995 |

Saturday:

| State | Period Start | Period End | Response Time (ms) |
| --- | --- | --- | --- |
| Maintenance/ No-Service | 00:00 | 23:59 | N/A |

Figure 1:
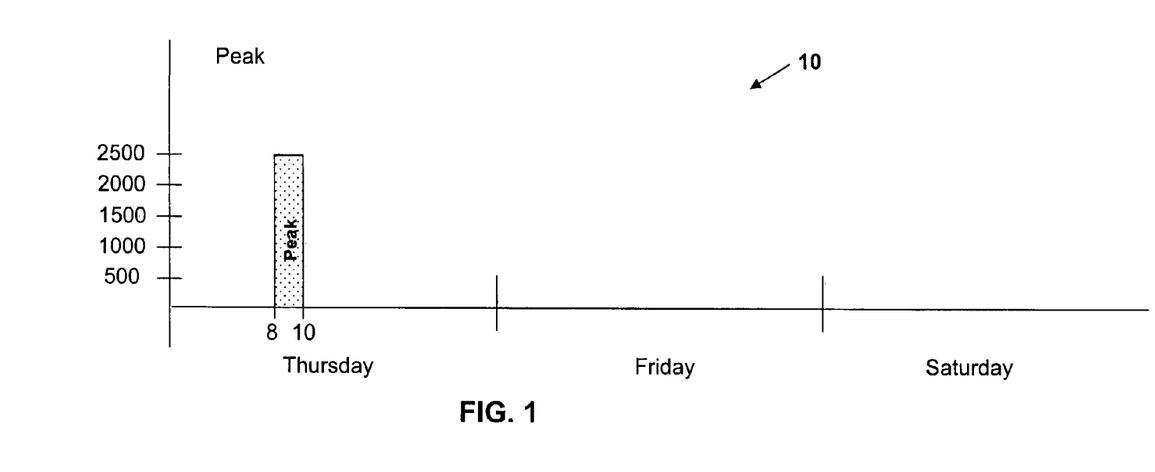
FIGS. 1-4 depict area charts produced in accordance with the present invention.
Figure 2:
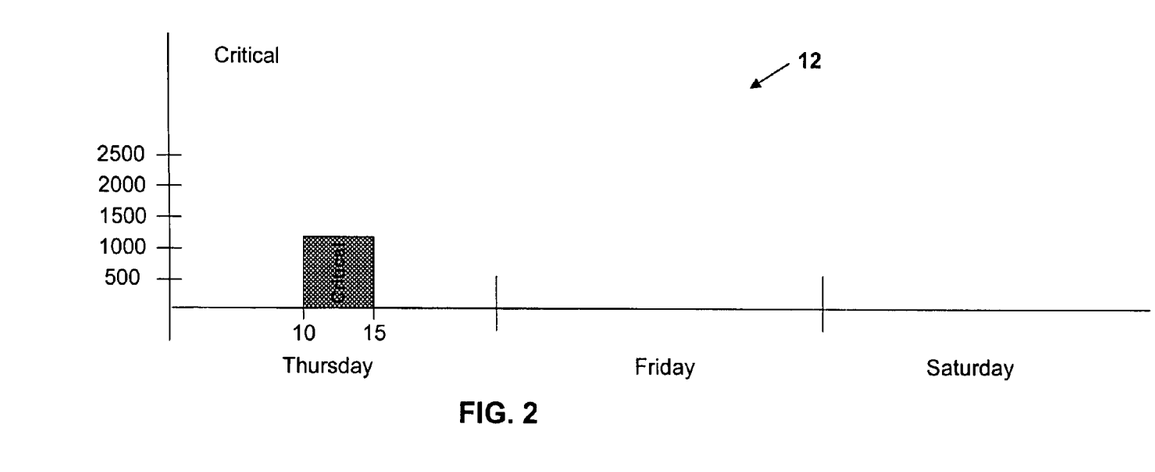
Figure 3:
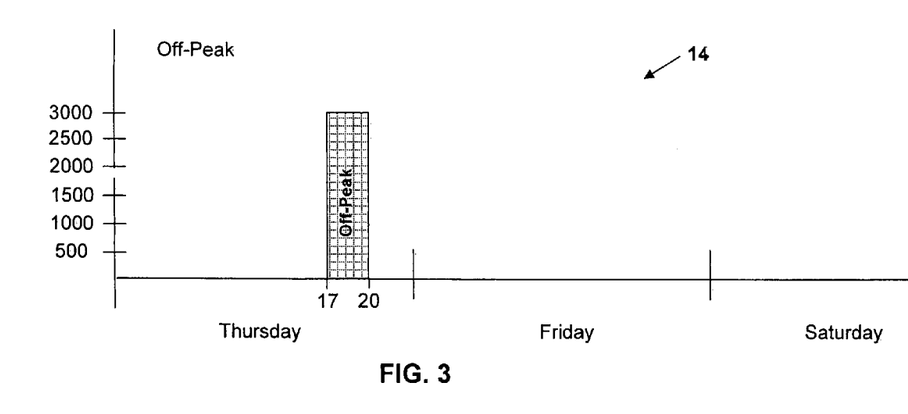
Figure 4:
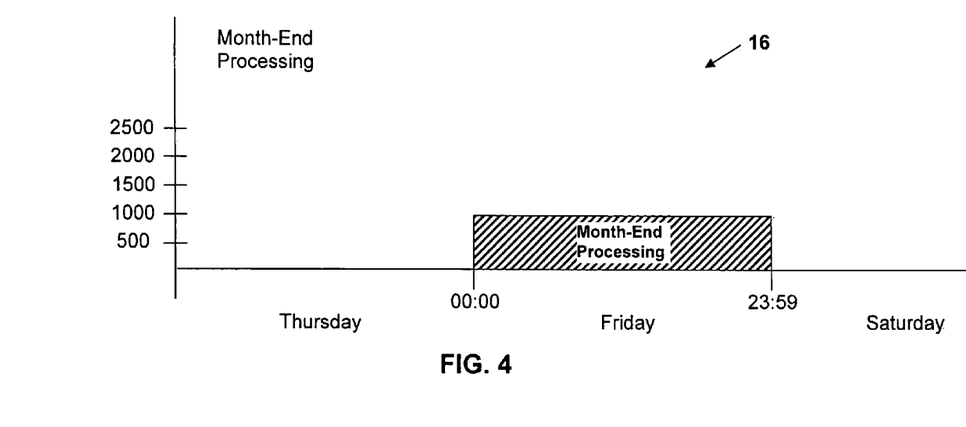

In accordance with the present invention, the metric (e.g., session response time) measured for each state (except Maintenance/No-Service) is charted independently using an area chart, wherein the height of each area chart corresponds to a measured session response value (for clarity, it is assumed in this example that the measured session response value remains constant during each state). The area chart 10 generated for the Peak state for the above example is shown in FIG. 1, the area chart 12 for the Critical state is shown in FIG. 2, the area chart 14 for the Off Peak state is shown in FIG. 3, and the area chart 16 for the Month-End Processing state is shown in FIG. 4. Each area chart 10, 12, 14, 16 can be charted using a different color, pattern, etc., and/or provided with identifying indicia, such that the data in each area chart can easily be distinguished in each composite view (described below) provided by the present invention. Comparing FIGS. 1-4, it can be seen that the calendar periods displayed in the area charts do not overlap one another.

Figure 5:
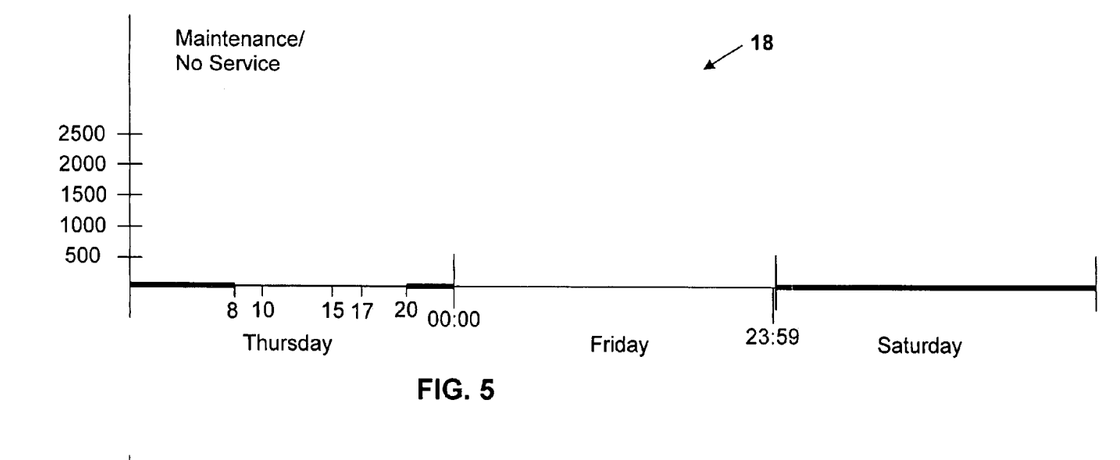
FIG. 5 depicts a line chart produced in accordance with the present invention.

As shown in FIG. 5, a line chart 18 is provided for the Maintenance/No-Service state. During this state, scheduled maintenance such as data backups, software/hardware upgrades, etc., are be performed. In FIG. 5, the calendar periods corresponding to the Maintenance/No-Service state are charted along the x-axis. The calendar period(s) in line chart 18 do not overlap the calendar period in any of the area charts 10, 12, 14, 16 described above. In the line chart 18, the periods of time corresponding to the Maintenance/No-Service state are charted using a thick line. Other line-charting techniques can also be used to represent the periods of time corresponding to the Maintenance/No-Service state.

Figure 6:
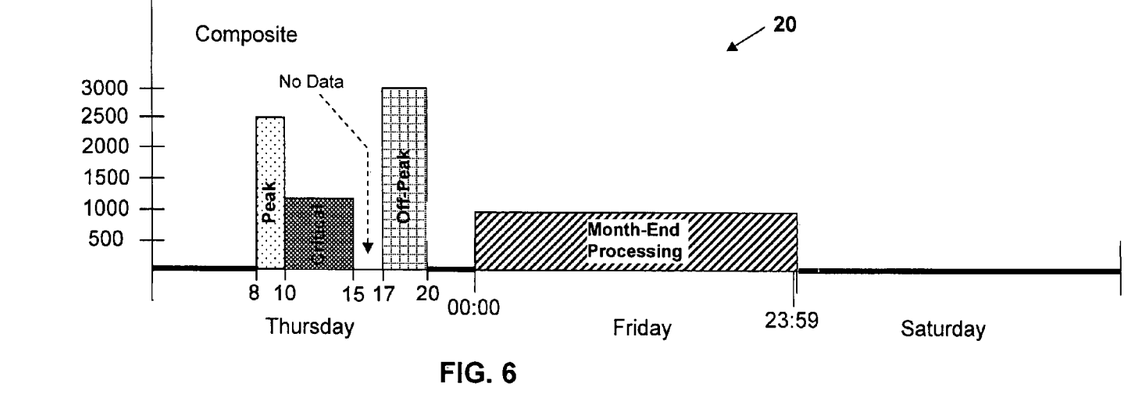
FIG. 6 depicts a composite view of the area charts of FIGS. 1-4 and the line chart of FIG. 5 overlaid on one another, produced in accordance with the present invention.

When the area charts 10, 12, 14, 16 and the line chart 18 are overlaid on one another, a composite view 20 of the SLO evaluation period is generated as shown in FIG. 6. Advantageously, the composite view 20 provides a great deal of information to the user. For example, the start and end of each calendar period is displayed. As can be readily seen in the composite view 20 in FIG. 6, the following calendar periods are displayed on Thursday:
00:00 to 08:00;
08:00 to 10:00;
10:00 to 15:00;
15:00 to 17:00;
17:00 to 20:00; and
20:00 to 00:00.

Friday includes a calendar period from 00:00 to 23:59. The next calendar period starts at 00:00 and extends all through the day on Saturday.

In addition to the start and end of each calendar period, the composite view 20 displays the system state (i.e., Peak, Critical, Off Peak, Month-End Processing, and Maintenance/No Service) and measured results during each calendar period. If no data was provided in one or more calendar periods in the composite view, this indicates that the data source failed for some reason during those calendar periods. For example, in the composite view 20, it can be easily and quickly determined that no data was provided for the calendar period from 15:00 to 17:00 on Thursday. This may have occurred, for example, because of a power failure, system malfunction, etc. Referring to the table for Thursday presented above, it can be seen that this calendar period should have corresponded to a Peak state.

Figure 7:
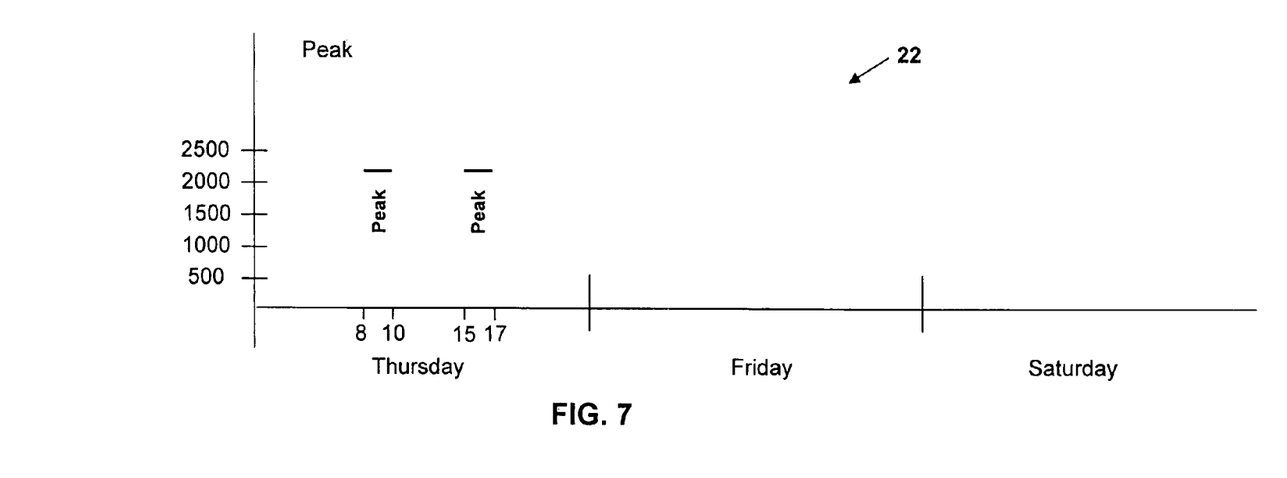
FIGS. 7-10 depict line charts produced in accordance with the present invention.
Figure 8:
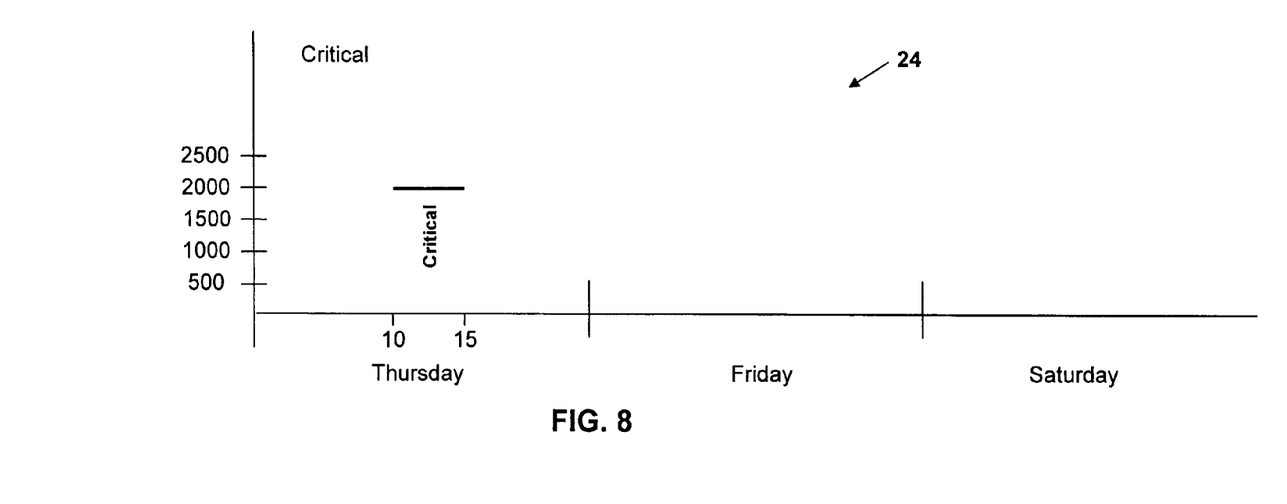
Figure 9:
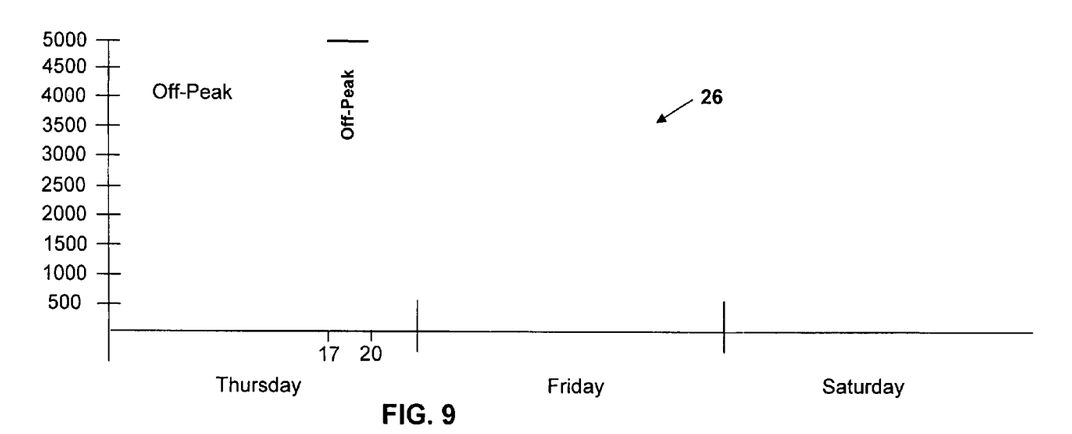
Figure 10:
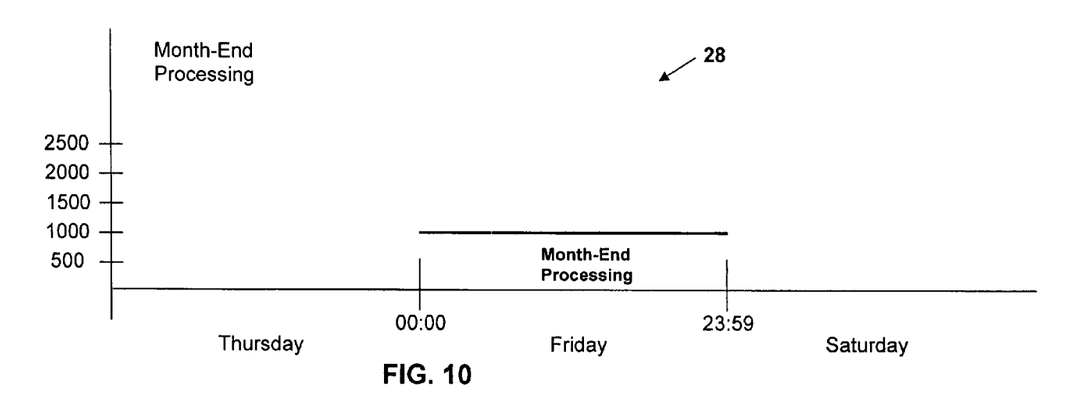

The breach value for each state (except Maintenance/No Service) is charted independently using a line chart. A line chart 22 displaying the breach value for the Peak state in the above example is displayed in FIG. 7. Similarly, line charts 24, 26, 28 displaying the breach values for the Critical, Off Peak, and Month-End Processing states, respectively, are displayed in FIGS. 8-10. As shown, each line chart 22, 24, 26, 28 employs the same type of line. However, different types/colors/styles of lines could also be used to represent the breach values for different states. Identifying information regarding the corresponding state may also be provided in each line chart 22, 24, 26, 28.

Figure 11:
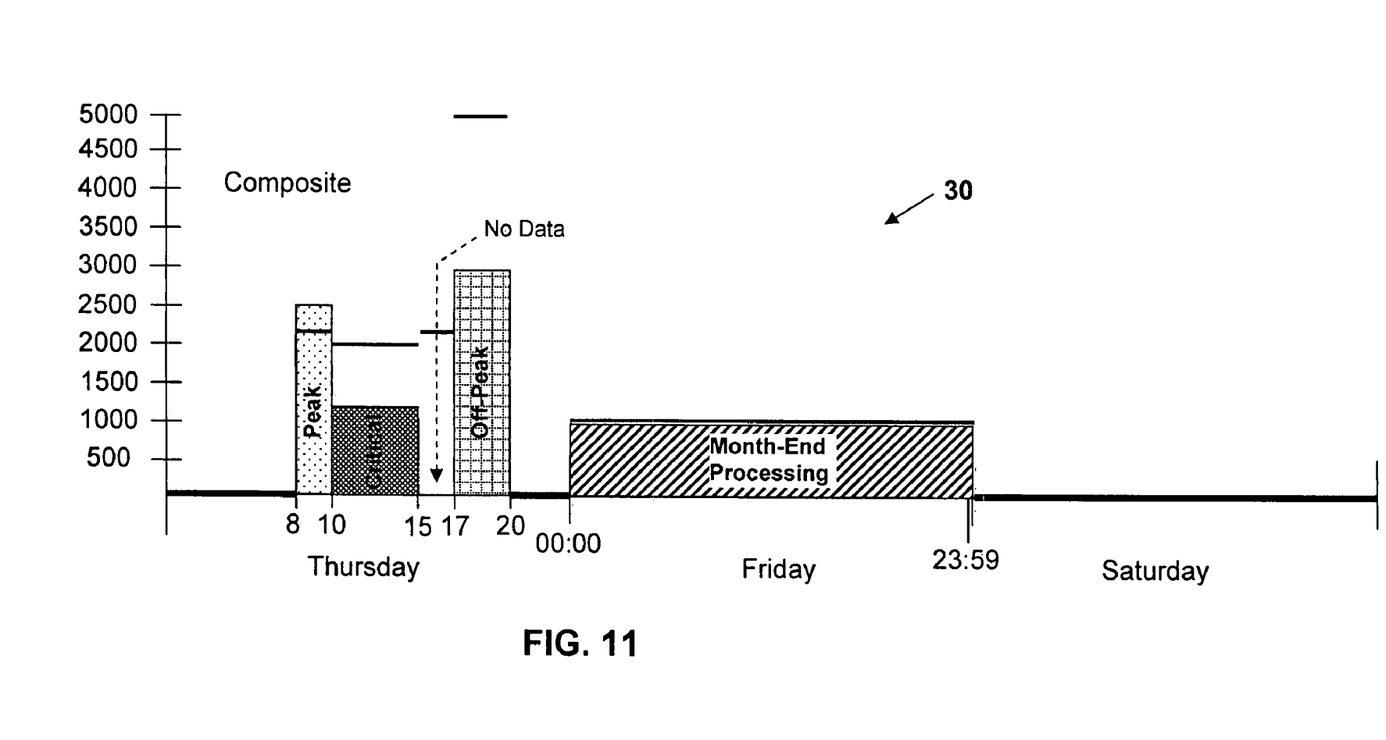
FIG. 11 depicts a composite view of the area charts of FIGS. 1-4 and the line charts of FIGS. 5 and 7-10 overlaid on one another, produced in accordance with the present invention.

When the line charts 22, 24, 26, 28 are overlaid on the composite view 20, a more detailed composite view 30 of the SLO evaluation period is generated as shown in FIG. 11. In addition to the detailed information provided by the composite view 20 of FIG. 6, the composite view 30 also displays the breach values for different states/calendar periods. This allows a user to easily and quickly determine whether any breach values were exceeded, for which state(s), and during which calendar period(s). For example, it can be seen in FIG. 11 that the required breach value for the Peak state (2200 ms) during the calendar period of 08:00 to 10:00 on Thursday was exceeded.

The present invention provides many advantages over prior art techniques including, for example:
1) It provides a user (e.g., customer) with a view of the service level over a given time period based on an associated business calendar, and provides a new way of visualizing SLA data using a single composite view.
2) It provides the user with the ability to distinguish, at a glance, the difference between a valid service time as well as an unavoidable data loss situation (e.g., due to a power outage). Known SLA reporting systems may log errors or generate an event (e.g., error message) when this occurs, but do not provide any form of visualization for the user to account for unavoidable data loss.
3) A user is able to see exactly where a service period starts and ends rather than an approximated view as provided by existing SLA reporting systems (e.g., using a simple "bar" chart overlaid with a static line chart).

Figure 12:
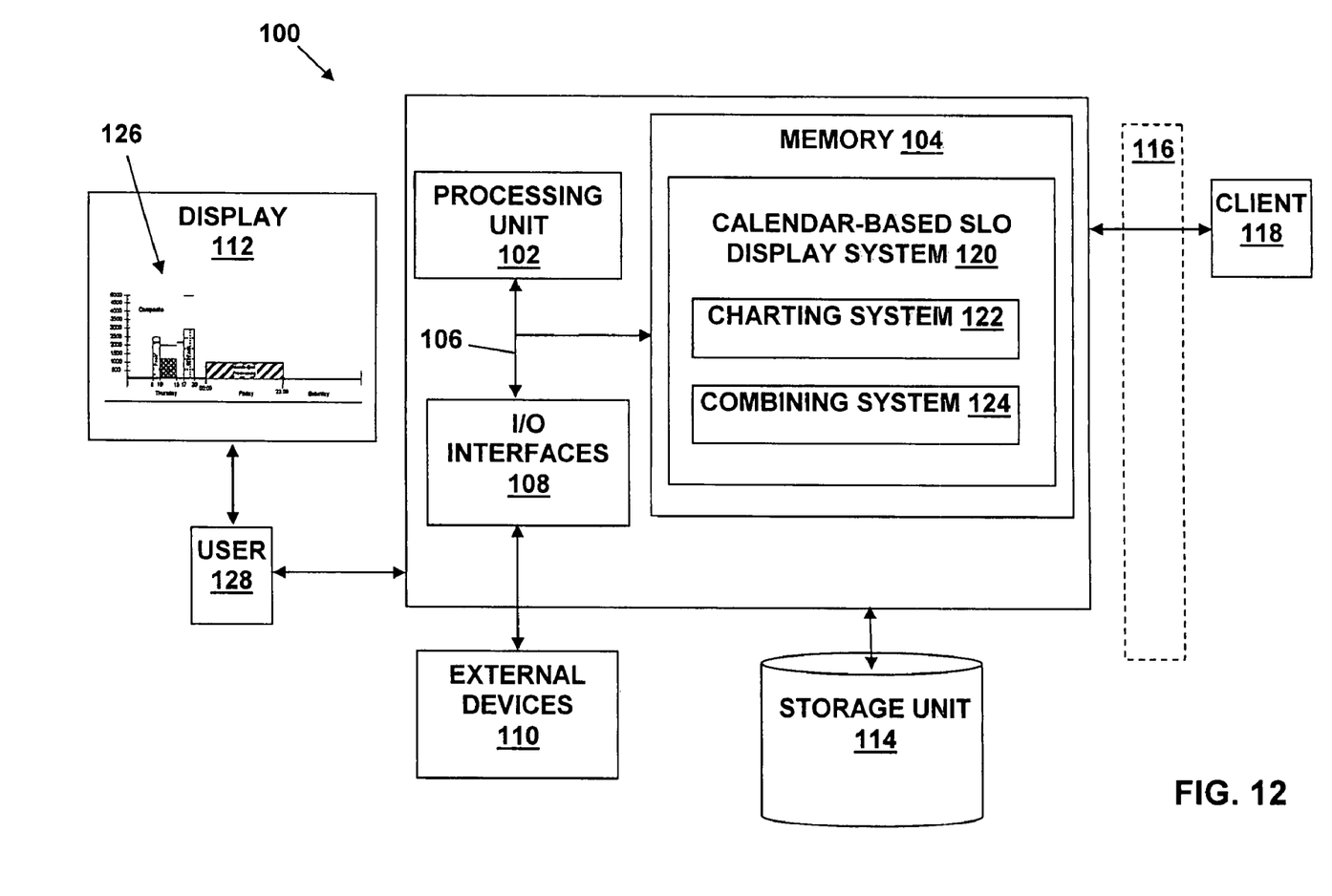
FIG. 12 depicts a computer system for displaying calendar-based SLO results and breach values in accordance with an embodiment of the present invention.

A computer system 100 for displaying calendar-based SLO results and breach values in accordance with an embodiment of the present invention is illustrated in FIG. 12. As shown, computer system 100 generally includes a processing unit 102, memory 104, bus 106, input/output (I/O) interfaces 108, external devices/resources 110, and storage unit 112. Processing unit 102 may comprise a single processing unit, or may be distributed across one or more processing units in one or more locations. Memory 104 may comprise any known type of data storage media, including magnetic media, optical media, random access memory (RAM), read-only memory (ROM), etc. Moreover, similar to processing unit 102, memory 104 may reside at a single physical location, comprising one or more types of data storage, or be distributed across a plurality of physical systems in various forms.

I/O interfaces 108 may comprise any system for exchanging information to/from an external source. External devices/resources 110 may comprise any known type of external device, including speakers, a CRT, LED screen, handheld device, keyboard, mouse, voice recognition system, speech output system, printer, monitor/display (e.g., display 112), facsimile, pager, etc.

Bus 106 provides a communication link between each of the components in computer system 100, and likewise may comprise any known type of transmission link, including electrical, optical, wireless, etc. In addition, although not shown, additional components, such as cache memory, communication systems, system software, etc., may be incorporated into computer system 100.

Data (e.g., SLAs, SLOs, measured metric values, area charts, line charts, etc.) used in the practice of the present invention can be stored locally to computer system 100, for example, in storage unit 114, and/or may be provided to computer system 100 over a network 116. Storage unit 114 can be any system capable of providing storage for data and information under the present invention. As such, storage unit 114 may reside at a single physical location, comprising one or more types of data storage, or may be distributed across a plurality of physical systems in various forms. In another embodiment, storage unit 114 may be distributed across, for example, a local area network (LAN), wide area network (WAN) or a storage area network (SAN) (not shown).

Network 116 is intended to represent any type of network over which data can be transmitted. For example, network 116 can include the Internet, a wide area network (WAN), a local area network (LAN), a virtual private network (VPN), a WiFi network, or other type of network. To this extent, communication can occur via a direct hardwired connection or via an addressable connection in a client-server (or server-server) environment that may utilize any combination of wireline and/or wireless transmission methods. In the case of the latter, the server and client may utilize conventional network connectivity, such as Token Ring, Ethernet, WiFi or other conventional communications standards. Where the client communicates with the server via the Internet, connectivity could be provided by conventional TCP/IP sockets-based protocol. In this instance, the client would utilize an Internet service provider to establish connectivity to the server. One or more client devices 118 may be connected to computer system 100 via network 116. Each client device 118 comprises components similar to those described above with regard to computer system 100.

Shown in memory 104 as a computer program product is a calendar-based SLO display system 120 in accordance with the present invention. SLO display system 120 includes a charting system 122 for generating a plurality of independent area and line charts based on SLO data, and a combining system 124 for generating one or more composite views 126 (e.g., for display to a user 128 on display 112) by overlaying area/line charts generated by the charting system 122.

It should be appreciated that the teachings of the present invention can be offered as a business method on a subscription or fee basis. For example, computer system 100 could be created, maintained, supported, and/or deployed by a service provider that offers the functions described herein for customers. That is, a service provider could be used to provide and display calendar-based SLO results and breach values, as describe above.

It should also be understood that the present invention can be realized in hardware, software, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

We claim:

1. A method for displaying service level objective (SLO) information for a service, comprising:
    generating a plurality of area charts, wherein each area chart displays SLO result data for a different calendar period and for a different state of the service, and wherein each area chart displays a start and end of a respective calendar period;
    generating a first line chart displaying calendar periods corresponding to a predetermined state of the service, wherein the first line chart displays a start and end of each calendar period corresponding to the predetermined state; and
    overlaying and displaying the plurality of area charts and the first line chart to provide a first composite view of SLO information for the service, wherein the calendar periods in the plurality of area charts and the first line chart do not overlap.

2. The method of claim 1, wherein the predetermined state comprises a maintenance/no-service state.

3. The method of claim 1, wherein any calendar period in the composite view that does not contain SLO result data and that does not contain data from the first line chart indicates a failure of a data source providing the SLO result data.

4. The method of claim 1, further comprising:
    generating a plurality of additional line charts, wherein each additional line chart displays an SLO threshold for a different state of the service.

5. The method of claim 4, further comprising:
    overlaying the plurality of area charts, the first line chart, and the plurality of additional line charts to provide a second composite view of SLO information for the service.

6. A method for deploying an application for displaying service level objective (SLO) information for a service, comprising:
    providing a computer infrastructure being operable to:
    generate a plurality of area charts, wherein each area chart displays SLO result data for a different calendar period and for a different state of the service, and wherein each area chart displays a start and end of a respective calendar period;
    generate a first line chart displaying calendar periods corresponding to a predetermined state of the service, wherein the first line chart displays a start and end of each calendar period corresponding to the predetermined state; and
    overlay and display the plurality of area charts and the first line chart to provide a first composite view of SLO information for the service, wherein the calendar periods in the plurality of area charts and the first line chart do not overlap.

7. A system for displaying service level objective (SLO) information for a service, comprising:
    a system for generating a plurality of area charts, wherein each area chart displays SLO result data for a different calendar period and for a different state of the service, and wherein each area chart displays a start and end of a respective calendar period;
    a system for generating a first line chart displaying calendar periods corresponding to a predetermined state of the service, wherein the first line chart displays a start and end of each calendar period corresponding to the predetermined state; and
    a system for overlaying and displaying the plurality of area charts and the first line chart to provide a first composite view of SLO information for the service, wherein the calendar periods in the plurality of area charts and the first line chart do not overlap.

8. The system of claim 7, wherein the predetermined state comprises a maintenance/no-service state.

9. The system of claim 7, wherein any calendar period in the composite view that does not contain SLO result data and that does not contain data from the first line chart indicates a failure of a data source providing the SLO result data.

10. The system of claim 7, further comprising:
    a system for generating a plurality of additional line charts, wherein each additional line chart displays an SLO threshold for a different state of the service.

11. The system of claim 10, further comprising:
    a system for overlaying the plurality of area charts, the first line chart, and the plurality of additional line charts to provide a second composite view of SLO information for the service.

12. A program product stored on a computer recordable medium for displaying service level objective (SLO) information for a service, the computer recordable medium comprising program code for performing the following steps:
- generating a plurality of area charts, wherein each area chart displays SLO result data for a different calendar period and for a different state of the service, and wherein each area chart displays a start and end of a respective calendar period;
- generating a first line chart displaying calendar periods corresponding to a predetermined state of the service, wherein the first line chart displays a start and end of each calendar period corresponding to the predetermined state; and
- overlaying and displaying the plurality of area charts and the first line chart to provide a first composite view of SLO information for the service, wherein the calendar periods in the plurality of area charts and the first line chart do not overlap.

13. The program product of claim 12, wherein the predetermined state comprises a maintenance/no-service state.

14. The program product of claim 12, wherein any calendar period in the composite view that does not contain SLO result data and that does not contain data from the first line chart indicates a failure of a data source providing the SLO result data.

15. The program product of claim 12, further comprising:
- program code for performing a step of generating a plurality of additional line charts, wherein each additional line chart displays an SLO threshold for a different state of the service.

16. The program product of claim 15, further comprising:
- program code for performing a step of overlaying the plurality of area charts, the first line chart, and the plurality of additional line charts to provide a second composite view of SLO information for the service.

* * * * *